(12) United States Patent
Son et al.

(10) Patent No.: US 9,319,355 B2
(45) Date of Patent: Apr. 19, 2016

(54) COMMUNICATIONS SYSTEM HAVING INSTANT MESSAGE (IM) CONTACT BASED COMMUNICATIONS AND RELATED METHODS

(75) Inventors: Giyeong Son, Waterloo (CA); Iljee Yoon, Mississauga (CA); Andreea Manolescu, Mississauga (CA)

(73) Assignee: BlackBerry Limited, Waterloo (CA)

( * ) Notice: Subject to any disclaimer, the term of this patent is extended or adjusted under 35 U.S.C. 154(b) by 668 days.

(21) Appl. No.: 12/872,367

(22) Filed: Aug. 31, 2010

(65) Prior Publication Data

US 2012/0054314 A1    Mar. 1, 2012

(51) Int. Cl.
G06F 15/16    (2006.01)
H04L 12/58    (2006.01)

(52) U.S. Cl.
CPC ............... H04L 51/02 (2013.01); H04L 51/04 (2013.01)

(58) Field of Classification Search
CPC ...................................................... H04L 51/04
USPC ............... 709/206, 219; 455/403, 414.1, 466
See application file for complete search history.

(56) References Cited

U.S. PATENT DOCUMENTS

| | | | |
|---|---|---|---|
| 2003/0217109 A1* | 11/2003 | Ordille et al. | 709/206 |
| 2004/0024846 A1* | 2/2004 | Randall et al. | 709/219 |
| 2004/0176080 A1* | 9/2004 | Chakravorty et al. | 455/414.1 |
| 2007/0250571 A1* | 10/2007 | Griffin, Jr. | 709/204 |
| 2008/0270260 A1 | 10/2008 | Porter et al. | 705/26 |
| 2009/0187623 A1 | 7/2009 | Narayanaswami et al. | 709/204 |
| 2009/0215476 A1* | 8/2009 | Tysowski | 455/466 |
| 2010/0154023 A1* | 6/2010 | Dey | 725/151 |

FOREIGN PATENT DOCUMENTS

| | | | |
|---|---|---|---|
| EP | 2096808 | 9/2009 | ............. H04L 12/58 |
| WO | 2004/003810 | 1/2004 | ............. G06F 17/60 |
| WO | 2006/102448 | 9/2006 | ............. H04H 9/00 |
| WO | WO 2008/029219 A2 | 3/2008 | |

* cited by examiner

Primary Examiner — Vivek Srivastava
Assistant Examiner — Karina J Garcia-Ching
(74) Attorney, Agent, or Firm — Jenna L. Wilson; Dimock Stratton LLP

(57) ABSTRACT

A communications system may include a content provider device having an instant message (IM) content provider contact associated therewith and may be configured to store content. The communications system may include an IM contact server configured to register the content provider device and thereafter allow subscriber access to the IM content provider contact. The communications system may further include a communications server configured to communicate with the content provider device, and a subscriber device configured to access the IM content provider contact from the IM contact server, and download content from the content provider device via the communications server and based upon the IM content provider contact.

15 Claims, 5 Drawing Sheets

COMMUNICATIONS SYSTEM HAVING INSTANT MESSAGE (IM) CONTACT BASED COMMUNICATIONS AND RELATED METHODS

TECHNICAL FIELD

The present disclosure relates to the field of communications, and, more particularly, to messaging systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the Internet via a cellular network and/or a wireless local area network (WLAN), for example.

As the functionality of a mobile wireless communications device continues to increase, so do mobile applications and additional mobile services for the mobile wireless communications device. A mobile application may incorporate additional features of the mobile wireless communications device. For example, a mobile application may provide a listing of nearby restaurants based upon a location of the mobile wireless communications device using a global positioning system (GPS) feature. Moreover, a mobile application may provide a song title based upon audio being input into the microphone of the mobile wireless communications device, for example.

A service provider, for example, a digital content provider, and a device provider may cooperate to develop a mobile application or additional services to increase revenues. Development of a new mobile application or additional service may involve development of a relatively complex framework, and thus may have a relatively increased development cost. Moreover, terms and conditions of use may be accompanied with a mobile application, for example, and add to the relative complexity and cost thereof.

DETAILED DESCRIPTION OF THE PREFERRED EMBODIMENTS

Figure 1:
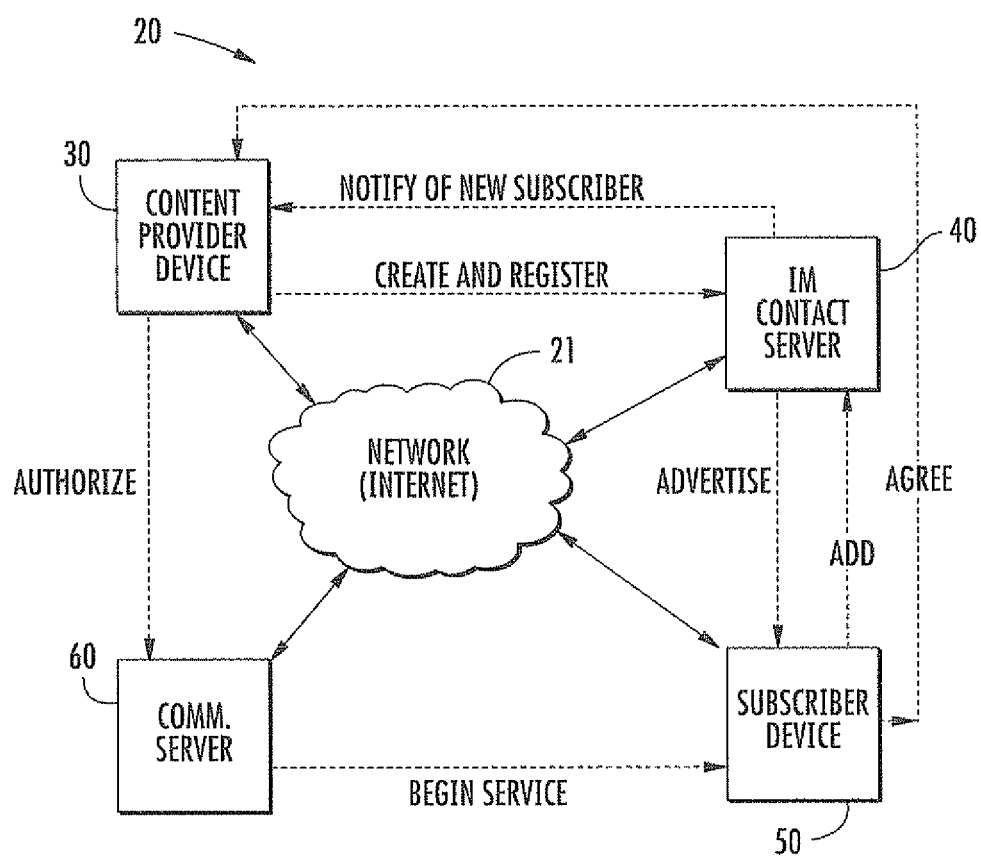
FIG. 1 is a schematic diagram of a communications system in accordance with an exemplary embodiment.
Figure 2:
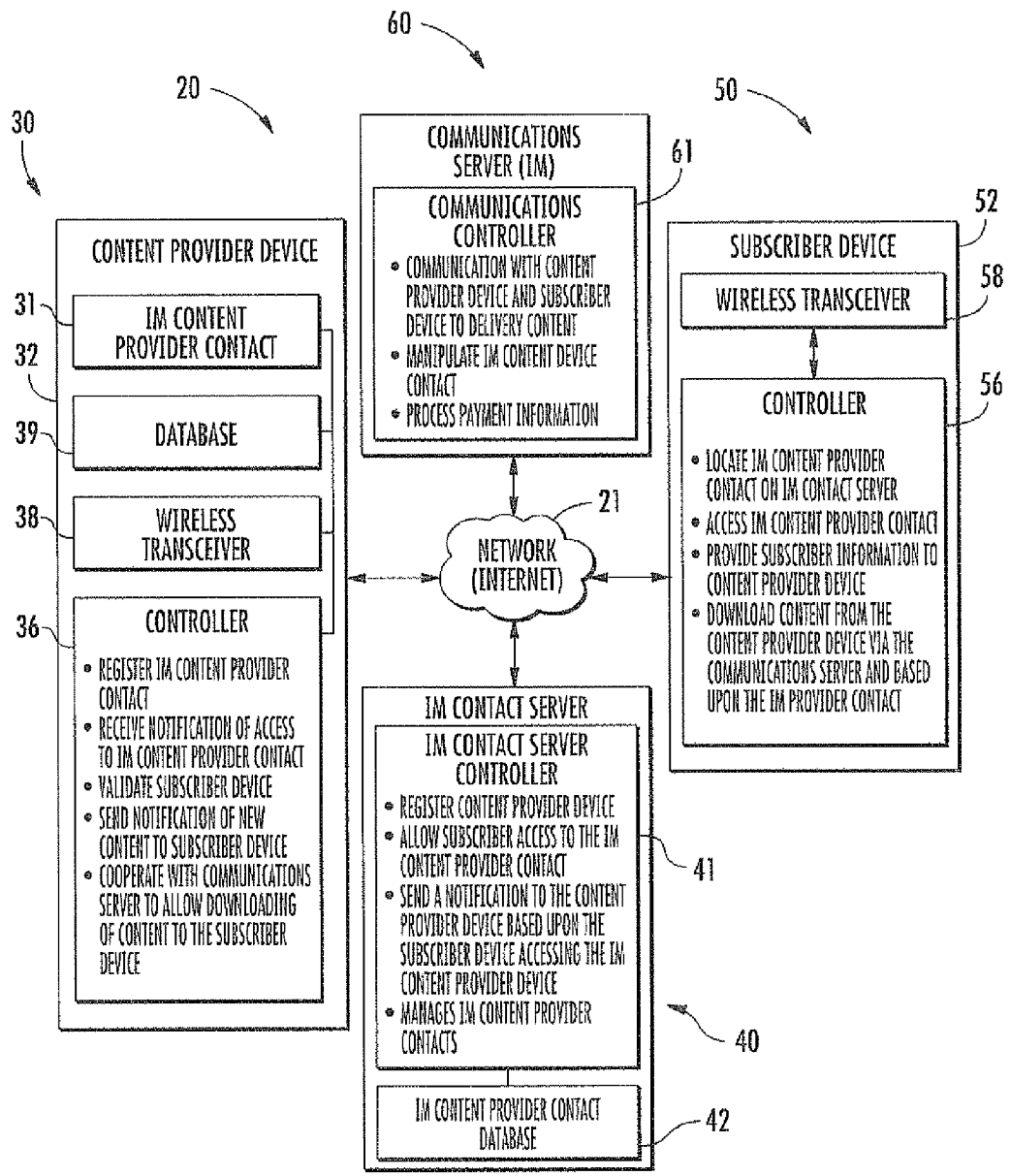
FIG. 2 is a more detailed schematic diagram of the communications system of FIG. 1.

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout.

According to an exemplary aspect, a communications system may include a content provider device having an instant message (IM) content provider contact associated therewith and may be configured to store content. The communications system may include an IM contact server configured to register the content provider device and thereafter allow subscriber access to the IM content provider contact, for example. The communications system may further include a communications server configured to communicate with the content provider device, and a subscriber device configured to access the IM content provider contact from the IM contact server, and download content from the content provider device via the communications server and based upon the IM content provider contact. Accordingly, new content and services may be more easily located and more quickly delivered.

The IM contact server may be configured to send a notification to the content provider device based upon the subscriber device accessing the IM content provider contact. The content provider device may also be configured to validate the subscriber device to permit downloading of content, for example.

The content provider device may further be configured to store updated content. The IM contact server may be configured to send a notification to the subscriber device relating to the updated content, for example.

The communications system may further include a new content provider device having a new IM content provider contact associated therewith and configured to store new content. The IM contact server may be configured to register the new content provider device and thereafter allow subscriber access to the new IM content provider contact. The IM contact server may be configured to send a notification to the subscriber device relating to the new IM content provider contact and new content, for example.

The subscriber device may include a wireless transceiver and a controller cooperating therewith to perform at least one wireless communications function. The content provider device may include a mobile wireless content provider device, for example. The communications server may include an IM communications server.

A method aspect is directed to a communications method. The method may include using a using a content provider device having an instant message (IM) content provider contact associated therewith to store content. The method may also include using an IM contact server to register the content provider device and thereafter allow subscriber access to the IM content provider contact, and using a communications server to communicate with the content provider device, for example. The method may further include using a subscriber device to access the IM content provider contact from the IM contact server, and download content from the content provider device via the communications server and based upon the IM content provider contact.

Referring initially to FIGS. 1-4, the communications system 20 illustratively includes a content provider device 30 having an instant message (IM) content provider contact 31 associated therewith. The content provider device 30 is configured to store content, for example digital content. For example, digital content may include an electronic book (e-book), movie, song, or other digital content, as will be appreciated by those skilled in the art. The content provider device 30 is illustratively a mobile wireless content provider device, and more particularly, a cellular telephone.

The content provider device 30 includes a housing 32, a display 33 carried by the housing, and an audio transducer 35 also carried by the housing. The audio transducer 35 may be a microphone, for example. The audio transducer 35 may also be a speaker. In some example embodiments, there may be more than one audio transducer 35, for example, a microphone and speaker may be used and carried by the housing 32.

The content provider device 30 includes one or more input devices 37. The input devices 37 illustratively include push buttons for cooperating with a content provider device controller 36. In some example embodiments, the input device 37 may be an alphanumeric keypad or other input device for cooperating with the content provider device controller 36, for example. Still further, an input device 37 may be coupled to the display 33 to accept a touching input therefrom and cooperate with the content provider device controller 36.

The content provider device controller 36 is also carried by the housing 32 and cooperates with the wireless transceiver 38 to perform at least one mobile wireless communications function. For example, the wireless transceiver 38 may be a cellular transceiver or a WiFi transceiver, for example, and may cooperate with the controller 36 to communicate data and/or voice communications. Other types of wireless transceivers and mobile wireless communications functions will be appreciated by those skilled in the art. The content provider device 30 may be another type of device, for example, a personal digital assistant (PDA), or a desktop computer or server.

A content provider, for example, may advertise and sell digital content via the content provider device 30. The IM content provider contact 31 advantageously provides a service or communication context between the content provider device 30 and a subscriber device 50, which is illustratively a mobile wireless communications device.

The subscriber device 50 includes a housing, 52, a display 23 carried by the housing, and an audio transducer 55 also carried by the housing. The audio transducer 55 may be a microphone, for example. The audio transducer 55 may also be a speaker. In some example embodiments, there may be more than one audio transducer 55, for example, a microphone and speaker may be used and carried by the housing 52.

The subscriber device 50 includes one or more input devices 57. The input devices 57 illustratively include push buttons for cooperating with a subscriber device controller 56. In some example embodiments, the input device 57 may be an alphanumeric keypad or other input device for cooperating with the subscriber device controller 56, for example. Still further, an input device 57 may be coupled to the display 53 to accept a touching input therefrom and cooperate with the subscriber device controller 56.

The subscriber device controller 56 is also carried by the housing 52 and cooperates with the wireless transceiver 58 to perform at least one mobile wireless communications function. For example, the wireless transceiver 58 may be a cellular transceiver or a WiFi transceiver, for example, and may cooperate with the controller 56 to communicate data and/or voice communications. Other types of wireless transceivers and mobile wireless communications functions will be appreciated by those skilled in the art. The subscriber device 50 may be another type of device, for example, a personal digital assistant (PDA), or a desktop computer or server.

The subscriber device 50 can find and subscribe to services or content by adding a registered IM content provider contact 31 to a subscriber device contact list. The subscriber device 50 may include a subscriber device client application for providing a user interface. A client application may be an IM client application, for example, an IM client application provided by MSN™, Yahoo™, and AOL™.

There are several types of IM content provider contacts 31 associated with a content service or the content provider device 30. For example, an IM content provider contact 31 may be a public contact corresponding to the digital content provider, or the content provider device 30. In this example, the content provider device 30 is represented by the IM content provider contact 31 so any transactions between the content provider device 30 and a subscriber device 50 are performed via the IM content provider device 31.

An IM content provider contact 31 may also correspond to the content itself. In other words, the content itself is represented by the IM content provider contact 31. Thus, a transaction of content, for example, an order and confirmation, between the content provider device 30 and the subscriber device 50 may be performed by using the IM content provider contact 31. The IM content provider contact 31 may be especially advantageous for advertising and delivery of content to a subscriber. Additionally, a subscriber or mobile wireless communications device user may advertise and communicate with other people, for example.

The IM content provider contact 31 may have additional information associated with it. For example, the IM content provider contact 31 may have an associated IM content provider contact identifier (ID). The IM content provider contact 31 may also include a contact name associated therewith. For example, the contact name may include a person's name or other identifying name to identify the type of content, for example.

The IM content provider contact 31 may also have a contact type associated with it. For example, a contact type may include a user, for example, an owner of a subscriber device 50, a service, a system, digital content (for example, an e-book, song, movie, etc.), or a service provider or content provider device 30. The IM content provider contact 31 may also have a service or communication method and related information associated with it. For example, the communication method information may relate to how the subscriber device 50 receives the content or service, or how the subscriber device and the content provider device 30 communicate with each other.

For example, if the contact type is a notification service, the service method may be set to IM or short messaging service (SMS). If the contact type is digital content, for example (a picture, song, or e-book), the service method may be set to a hypertext transport protocol (HTTP), which includes required HTTP information, for example a uniform resource locator (URL) to the digital content. In other words, as will be appreciated by those skilled in the art, the content may be delivered via another protocol which may not be an IM protocol.

The IM content provider contact 31 may also have a description associated with it. The description may provide a relatively short description about the IM content provider contact 31. For example, if the contact type is set to a notification service, the description may include a relatively short description about the notification service, for example, so the subscriber device 50 may know the service represented by the IM content provider contact 31. If the contact type is a digital content provider, for example, the description may include information about the content provider device 30, content provider itself, and available content.

The IM content provider contact 31 may also include a review attribute associated with it. For example, a user of a subscriber device 50 may provide comments or review the content provided by the content provider device 30. In other words, subscriber feedback may be made via the IM content provider contact 31.

The content provider device 30 also includes a subscriber database 39. The subscriber database 32 may include subscribers or subscriber device IDs having a history of non-payment (i.e. a blacklist). The subscriber database 32 may include other types of data and be for other purposes, for example.

The communications system 20 may include an IM contact server 40 configured to register the content provider device 30 and thereafter allow subscriber access to the IM content provider contact 31. The IM contact server 40 including an IM contact server controller 41 manages the IM content provider contacts 31 and provides communications operations between the content provider device 30 and the subscriber device 50. The IM contact server 40 manages the IM content provider contacts 31 service or content delivery and subscription. For example, the unique ID associated with the IM content provider contact 31 may be created and managed by the IM contact server 40. The IM contact server 40, as a manager of the IM content provider contacts 31 may be a scalable, have increased reliability, and have improved security. The IM contact server 40 may also include a database 42 for storing the IM content provider contacts 31 and corresponding information.

The communications system 20 may further include a communications server 60 including a communications device controller 61 configured to communicate with the content provider device 30. The communications server 60 advantageously delivers the content or service from the content provider device 30 to the subscriber device 50. The communications server 60 may also be for IM content provider contact 31 manipulation. For example, the content provider device 30 and the subscriber 50 may communicate, via the communications sever 60, with the IM contact server 40 to manipulate the IM content provider contact 31, for example. For example, such manipulation may include creation of an IM content provider contact 31, registration of an IM content provider contact, notification of a new IM content provider contact, and addition of an IM content provider contact (i.e. acceptance of customers). The communications server 60 may also process payment information, for example, credit card information, and other membership information.

The communication server 60 also provides IM communications to the subscriber device 50. The IM communications may be pushed from the content provider device 30 to subscribed subscriber devices, for example, to advertise new content. Communications via the communications server 60 may be secure, as will be appreciated by those skilled in the art.

Figure 3:
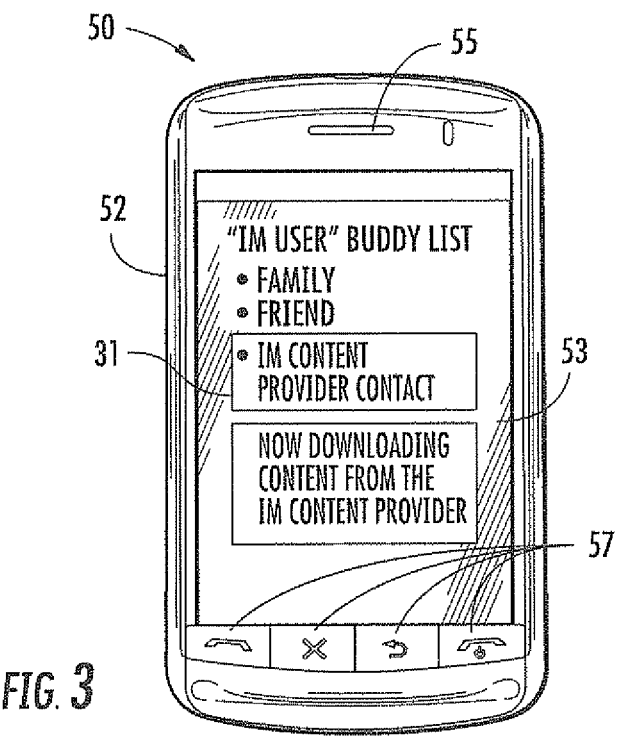
FIG. 3 is a plan view of the subscriber device of FIG. 1.
Figure 4:
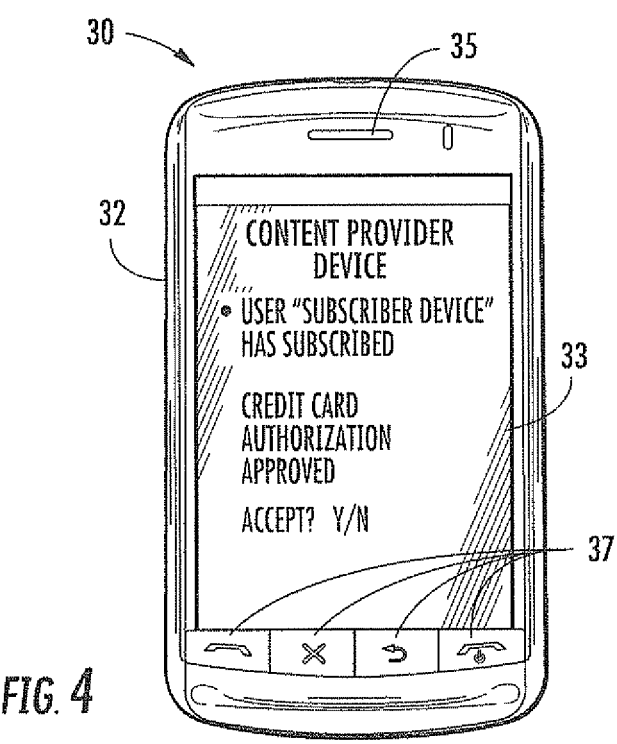
FIG. 4 is a plan view of the content provider device of FIG. 1

The subscriber device 50 is configured to access the IM content provider contact 31 from the IM contact server 40. The subscriber device 50 advantageously is configured to download content from the content provider device 30 via the communications server 60 and based upon the IM content provider contact 31 (FIG. 3). The content may also be downloaded from a proxy or third party device (not shown) acting on behalf of the content provider device 30. The content provider device 30 may validate the subscriber device 50 prior to downloading of the content, for example, verifying an email address or authorizing a credit card for payment (FIG. 4).

The communications system 20, including the subscriber device 50, the content provider device 30, the communications server 60, and the IM contact server 40 may communicate over a network 21. The network 21 may be the Internet for example. The network may also include a combination of different types of networks, for example, a cellular network, and a wireless local area network (WLAN). The network 21 may include other types of networks, as will be appreciated by those skilled in the art.

A subscriber using the subscriber device 50 may find a content provider device 30 and become a member by registering or adding the corresponding IM content provider contact 31. The subscriber may also purchase content by adding the IM content provider contact 31 of the new content that corresponds to the content provider device 30 or content provider.

Figure 5:
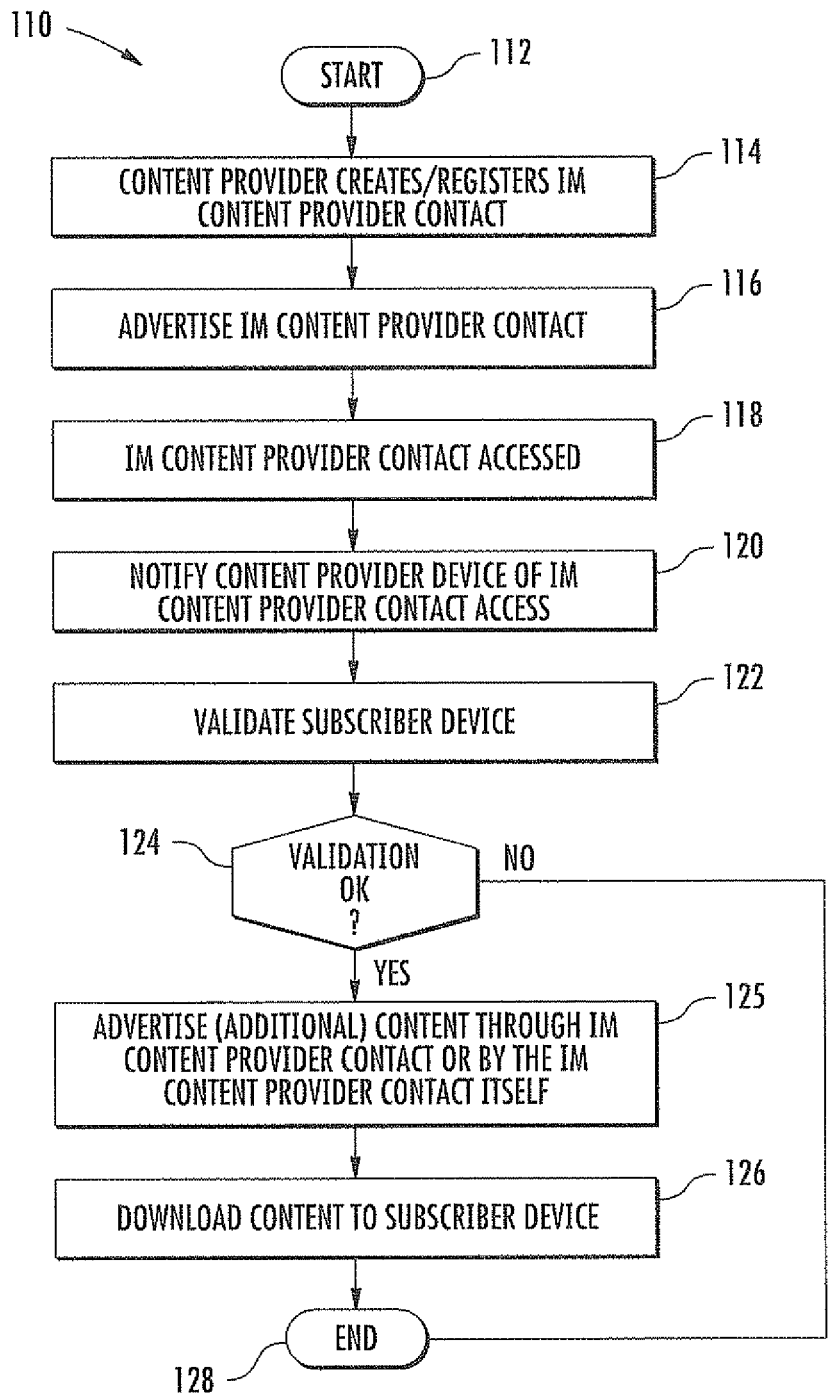
FIG. 5 is a flow diagram of a method of communication in accordance with an exemplary aspect.

Referring now to the flowchart 110 in FIG. 5, beginning at Block 112, operation of the communications system with regard to the content provider device 30 is described. At Block 114, the content provider device 30 creates and registers an IM content provider contact 31 to deliver content or a service. In some embodiments, the content provider device 30 creates and registers an IM content provider contact 31 that is representative of the content or service. For example, the IM content provider contact 31 may represent a particular song.

If the content provider device 30 is a mobile wireless communications device, for example, the IM content provider contact 31 may be registered to the IM contact server 40 via a content provider client application in the content provider device. If the content provider device 30 is not a mobile wireless communications device, for example, the IM content provider contact 31 may be created and registered through an interface provided by IM contact server 40. The interface may be web-based interface, for example, or other type of interface, as will be appreciated by those skilled in the art.

Once an IM content provider contact 31 is created and registered by the content provider device 30, the IM content provider contact may be advertised (Block 116). For example, the IM content provider contact 31, or content represented by the IM content provide contact, may be advertised by a notification. More particularly, a subscriber device 50 may set or permit advertisement of new IM content provider contacts, or data represented by the IM content provider contacts, based upon certain criteria through notifications. Any new IM content provider contacts satisfying the criteria may be advertised to the users through notifications.

Additionally, the subscriber device 50 may be notified from the IM contact server 40 of content updates that may have been provided by the content provider device 30. The subscriber device 50 may also be notified from the IM contact server 40 of a new IM content provider contact 31 that represents new content. A subscriber device 50 may also browse the IM contact server 40 to find existing and new IM content provider contacts 31. The IM contact server 40 and the client application of the subscriber device 50 may provide improved quality of user experience (QoE), as will be appreciated by those skilled in the art.

At Block 118, when a user of a subscriber device 50 finds an IM content provider contact 31 of interest, the user adds the IM content provider contact in a contact list in the subscriber device 50. Once the IM content provider contact 31 is added to the contact list of the subscriber device 50, the content provider device 30 is notified of a new service subscriber, or of the subscriber device 50 accessing the IM content provider contact (Block 120).

Thereafter, the content provider device 30 performs procedures for beginning the service or providing content to the subscriber device 50 (Block 122). For example, a service charging contract or agreement may be negotiated between the content provider device 30 (content provider) and the subscriber device 50 (subscriber). In another example, if the IM content provider contact 31 is an online book seller, for example, a user account corresponding to the user or subscriber device 50 may be created before ordering any books from the book seller.

If, however, the subscriber is already an authorized subscriber, or member, the content may be downloaded to the subscriber device 50, as a payment agreement is already established. For example, if the subscriber is already authorized, information, such as payment method, delivery address, etc. are already known. After the subscriber have been validated (Block 124), the subscriber device 50 may download the ordered content according to the service method specified in the IM content provider contact 31.

After successful validation at Block 124, at Block 125, content, which may be additional content, may be advertised through the IM content provider contact 31. Alternatively, or additionally, in the case where the content is represented by the IM content provider contact 31, the content may be advertised by the IM content provider contact itself. At Block 126, once the content provider device 30 accepts and authorizes subscription request from the subscriber device 50, the subscriber may begin receive the service or content before ending at Block 128.

As will be appreciated by those skilled in the art, the communications system 20 advantageously provides an increased reliability, security, and efficiency communications framework. The communications system 20 advantageously enables the content providers, via the content provider device 30, and subscribers, via the subscriber device 50, to publish and subscribe to content services with increased ease, reliability, and security.

From a business perspective, the communications system 20 advantageously enables various types of relatively valuable business models. For example, the communications system 20 may allow a relatively large number of subscriber devices 50 to subscribe or connect to a content provider device via the IM contact server 40. In one particular example, a relatively large amount of IM users may subscribe for content or subscribe to the service. Content providers may advertise services, information, and products, and may charge their subscribers for the service.

The service fee may be based on a subscription, the number of messages, or the number of service transactions, for example, or if the service is a mobile push service, such as stock trading information, online training, or other information, the service provider may charge a fee per subscription. If the service provider is a content provider or online merchandise seller, such as online book seller, charges may apply based upon a per service transaction when the subscriber downloads the respective content.

An owner or operator of the IM contact server 40 may charge a content provider based on the number of registered IM content provider contacts or devices, the number of messages, or service transactions, for example. The mobile device users may also be enabled to be a content provider and may also charge fees.

The communications system 20 may provide increased business opportunities and a unified service delivery framework. Moreover, a subscriber may expand corresponding subscriber device usage by subscribing to various multiple services. The communications system 20 may be especially beneficial in a push-type infrastructure, for example, as its infrastructure is robust and enables relatively easy and quick deployment compared to other infrastructures. Accordingly, a relatively large number of users, for example, may produce increased revenue from the service. Additionally, the communications system 20 may also improve sales of subscriber devices 50, for example mobile wireless communications devices.

The communications system 20 may be configured within a mobile push service, for example. Notification based services may be provided by corporate or non-profit organization or people, for example, news, weather, stock trading information or other valuable information. This service may be similar to Twitter™, for example, but may be based on an IM content provider contact. It may also provide increased reliability, efficiency, and security in notification subscription and delivery compared to Twitter™, for example, especially if the communications system 20 is integrated within a robust service infrastructure.

The communications system 20 may also particularly advantageous for digital content business, for example, an eBook, song, movie, etc., for a subscriber device 50. The communications system 20 may provide a digital content business that may be similar to the iTunes™ service, for example.

The communications system 20 may also be particularly advantageous in a mobile application store. Nowadays, many mobile device vendors operate a mobile application store. Some vendors may also operate some types of digital content business.

However, there may not be any parties who enable other anonymous service providers to sell their services similar to an application store. The communications system 20 advantageously enables a mobile application store, digital content business, or other business to be operated by the IM contact server operator, for example. This business model may have increased value to not only the service providers, but also the IM contact server operator.

Exemplary components that may be used in various embodiments of the above-described content provider and subscriber devices are now described with reference to an exemplary mobile wireless communications device 1000 shown in FIG. 6. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 6:
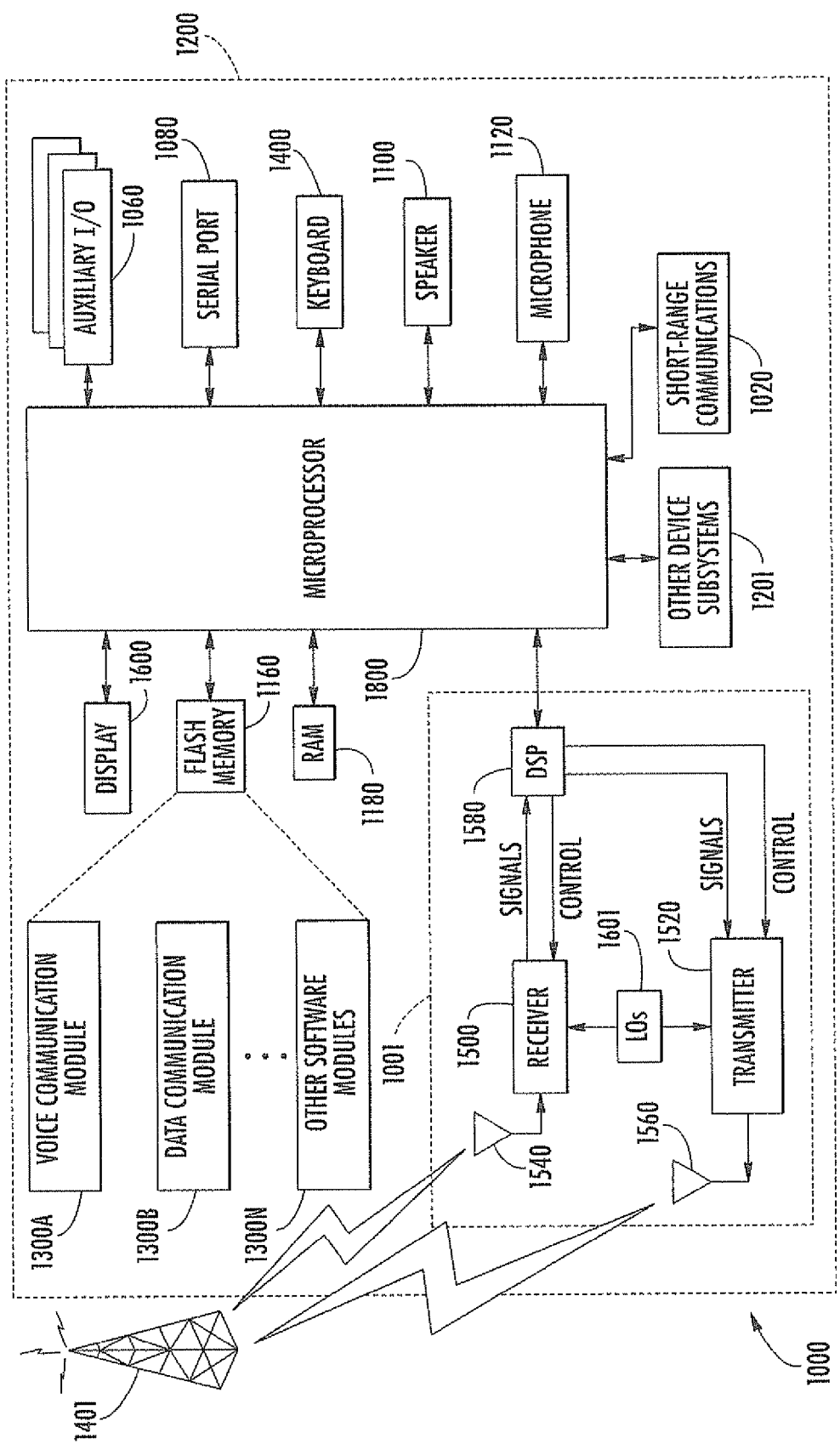
FIG. 6 is a schematic block diagram illustrating additional components that may be included in the subscriber device and the content provider device of FIG. 1.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 13003, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other example embodiments of the present disclose will come to the mind of one skilled in the art having the benefit of the teachings presented in the foregoing descriptions and the associated drawings. Therefore, it is understood that the present disclosure is not to be limited to the specific example embodiments disclosed, and that modifications and example embodiments are intended to be included within the scope of the appended claims.

That which is claimed is:

1. A communications system comprising:
    a content provider device configured to store content and having at least a first and a second instant message (IM) content provider contact associated therewith, the first IM content provider contact being associated with a notification service type and the second IM content provider contact being associated with a digital content type;
    an IM contact server configured to register said content provider device and thereafter allow subscriber access to the first and second IM content provider contacts;
    a communications server configured to communicate with said content provider device; and
    a subscriber device configured to:

add the first IM content provider contact and the second IM content provider contact to a subscriber contact list of the subscriber device;

display the subscriber contact list including both the first IM content provider contact and the second IM content provider contact, the subscriber contact list thus comprising contacts associated with a notification service type and a digital content type;

receive content associated with the first IM content provider contact by download from said content provider device via said communications server using an IM protocol or short messaging service (SMS) protocol based upon the notification service type associated with the first IM content provider contact; and receive content associated with the second IM content provider contact by download from said content provider device via said communications server using a hypertext transport protocol (HTTP) based upon the digital content type associated with the second IM content provider contact.

2. The communications system according to claim 1, wherein said IM contact server is configured to send a notification to said content provider device based upon said subscriber device accessing the first IM content provider contact.

3. The communications system according to claim 1, wherein said content provider device is configured to validate said subscriber device to permit downloading of content.

4. The communications system according to claim 1, wherein said content provider device is further configured to store updated content; and wherein said IM contact server is configured to send a notification to said subscriber device relating to the updated content.

5. The communications system according to claim 1, further comprising a new content provider device having a new IM content provider contact associated therewith and configured to store new content; wherein said IM contact server is configured to register said new content provider device and thereafter allow subscriber access to the new IM content provider contact; and wherein said IM contact server is configured to send a notification to said subscriber device relating to the new IM content provider contact and new content.

6. The communications system according to claim 1, wherein said subscriber device comprises a wireless transceiver and a controller cooperating therewith to perform at least one wireless communications function.

7. The communications system according to claim 1, wherein said content provider device comprises a mobile wireless content provider device.

8. The communications system according to claim 1, wherein said communications server comprises an IM communications server.

9. A communications method comprising:

using a content provider device having at least a first and second instant message (IM) content provider contact associated therewith to store content, the first IM content provider contact being associated with a notification service type and the second IM content provider contact being associated with a digital content type;

using an IM contact server to register the content provider device and thereafter allow subscriber access to the first and second IM content provider contacts;

using a communications server to communicate with the content provider device; and using a subscriber device to:
add the first IM content provider contact and the second IM content provider contact to a subscriber contact list of the subscriber device;

display the subscriber contact list including both the first IM content provider contact and the second IM content provider contact, the subscriber contact list thus comprising contacts associated with a notification service type and a digital content type;

receive content associated with the first IM content provider contact by download using an IM protocol or short messaging service (SMS) protocol based upon the notification service type associated with the first IM content provider contact; and receive content associated with the second IM content provider contact by download using a hypertext transport protocol (HTTP) based upon the digital content type associated with the second IM content provider contact.

10. The method according to claim 9, wherein using the IM contact server comprises using the IM contact server to send a notification to the content provider device based upon the subscriber device accessing the first IM content provider contact.

11. The method according to claim 9, wherein using the content provider device comprises using the content provider device to validate the subscriber device to permit downloading of content.

12. The method according to claim 9, wherein using the content provider device comprises using the content provider device to store updated content; and wherein using the IM contact server comprises using the IM contact server to send a notification to the subscriber device relating to the updated content.

13. The method according to claim 9, further comprising using a new content provider device having a new IM content provider contact associated therewith to store new content; wherein using the IM contact server comprises using the IM contact server to register the new content provider device and thereafter allow subscriber access to the new IM content provider contact; and wherein using the IM contact server comprises using the IM contact server to send a notification to the subscriber device relating to the new IM content provider contact and new content.

14. The method according to claim 9, wherein using the content provider device comprises using a mobile wireless content provider device.

15. The method according to claim 9, wherein using the communications server comprises using an IM communications server.

* * * * *